June 26, 1956  R. STEVENSON  2,752,177
FLUID SEAL
Filed June 27, 1951
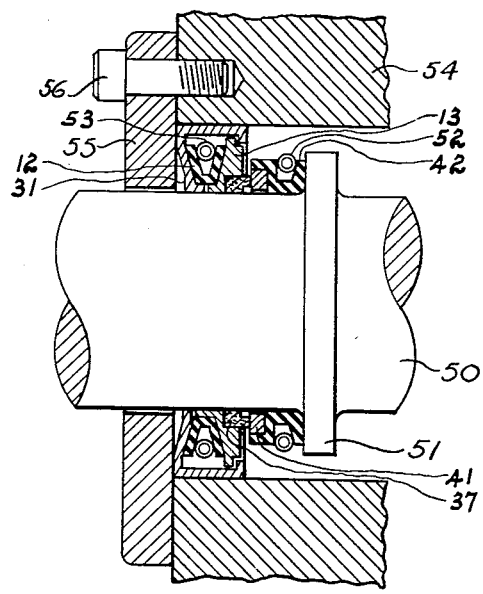
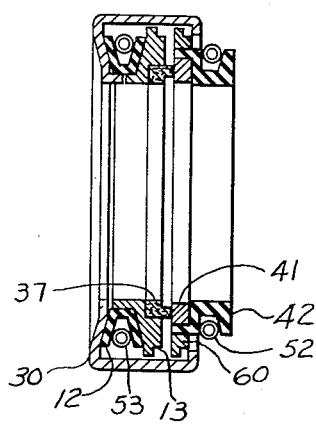
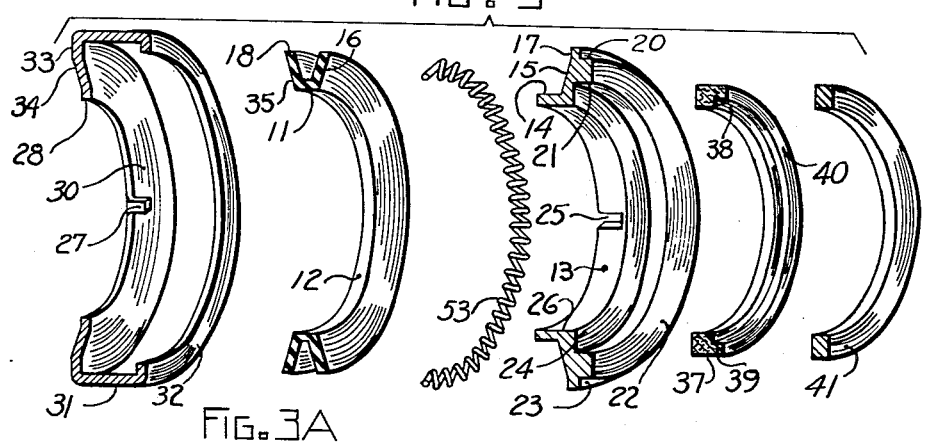
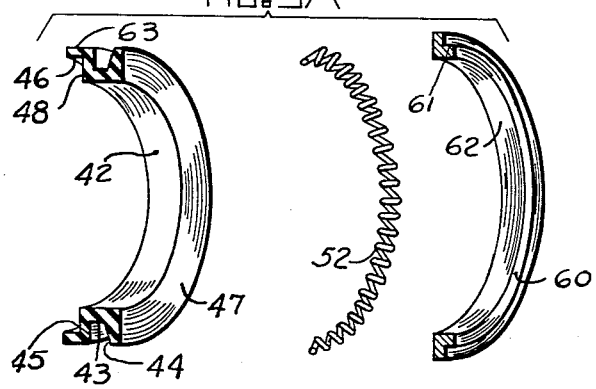
INVENTOR.
ROBERT STEVENSON
BY
William Frederick Werner
ATTORNEY

United States Patent Office 2,752,177
Patented June 26, 1956

2,752,177
FLUID SEAL

Robert Stevenson, Barrington, R. I., assignor to Anco, Inc., a corporation of Rhode Island Application June 27, 1951, Serial No. 233,797

1 Claim. (Cl. 286—11.15)

This invention relates to improvements in fluid seals and more particularly to that type of seal adapted for use with parts designed for relative rotation as with a shaft and housing construction.

The present invention is an improvement over my previous inventions embodied in United States Patents #2,189,685 issued February 6, 1940; #2,189,686 issued February 6, 1940; and #2,321,871 issued June 15, 1943.

One of the primary objects of the present invention is to provide an oil seal, between a rapidly revolving shaft and a housing, which will be self-adjusting for wear.

Another object of the present invention is to provide an oil seal for a revolving shaft and a stationary housing or a stationary shaft and a revolving housing which can be made more cheaply than heretofore due to greater tolerance allowance in manufacturing and still provide a leakproof oil seal.

Another object of the present invention is to provide a self-aligning oil seal between a shaft and a housing for the easy assembling of seal fuel pumps, sealed hydraulic pumps and motors, sealed transfer pumps, sealed gear boxes and speed reducers, sealed agitators and mixers, sealed gas turbines, sealed compressors and super-chargers and many other oil bathed shafts and revolving mechanisms.

Still another object of the present invention is to provide an oil seal between the relative rotation of a shaft and housing which will be positive acting under high oil pressure, low or high viscosity fluids or gases and require fewer replacement parts or adjustments due to wear or manufacturing inaccuracies.

And still a further object of the present invention is to provide a seal which may be sold as an assembled self-contained unit for easy attachment to a shaft and housing construction, as by insertion between radially spaced concentric surfaces. To this end, my invention may conveniently take the form of a double oil seal and radial bearing combination, which is readily pre-assembled and sold in a unitary self-contained assembled form, ready for attachment to the shaft and housing construction. The same unitary assembled device may be mounted within a hub and the entire hub may be thus sold as a pre-assembled, self-contained radial bearing unit having incorporated therein a positive gas or fluid seal.

And still another object of the present invention is to provide a larger sealing area than heretofore employed, without increasing the friction on the moving parts.

Other objects of this invention will be pointed out in part and become apparent in part in the following specification and claim.

The prior art fluid seals make little provision for wear and require accurate manufacturing tolerances and methods. The present invention overcomes these deficiencies in its novel construction and arrangement of the various parts.

Like reference numerals refer to like parts in the accompanying drawings, in which:

Figure 1 is a longitudinal sectional view taken through a housing and shaft construction showing one embodiment of the present invention; the shaft being shown in elevation.

Figure 2 is a longitudinal sectional view of the new and improved fluid seal unit ready for assembling on a shaft and housing construction.

Figure 3 is an exploded disassembled perspective view partly in section showing the various parts which constitute the invention shown in Figure 1.

Figure 3A is a continuation of the parts shown in Figure 3.

Part of the novelty of the present invention resides in the expansible washer 12 which is a V-shaped molded substance of oil impervious material such as the trademarked commercial products known as "Duprene," "Neoprene," "Coprene" and "Thiokol." The base of the V, 11, of expansible washer 12 rests on a concentric ledge 14 of a collar 13. Said ledge 14 has an angular side 15 adapted to accommodate one side 16 of the V of expansible washer 12. Angular side 15 terminates in a straight edge 17 which assists in urging the top edge 18 of expansible washer 12 downwardly.

A concentric annular collar consisting of an upper surface 20, a lower surface 21 and an outside surface 22 forms an integral part of collar 13 creating outer concentric surface 23 and inner concentric surface 24 for functions presently to be described. A keyslot 25 is provided in the inner face 26 of collar 13.

A housing 30, preferably fabricated from steel pressed into an annular, cupshaped member having an outside wall 31 terminating in side 33 formed at right angles to said wall 31. Side 33 terminates in an angular surface 34 adapted to accommodate side 35 of the V of expansible washer 12. The angular surface 34 blends into a concentric annular ring 28. A key 27 is provided in the edge face of ring 28.

An annular washer 37 fabricated from sealing material such as carbon or "Teflon" is formed with a cut back in one side providing annular faces 38 and 39.

A hardened steel ring 41 substantially rectangular in cross section is provided for reasons which will presently appear.

An annular washer 42 fabricated from the same oil impervious material as expansible washer 12 is provided with a groove 43 having an angular radial side 44 and a concentric side 45 in the main body portion and a ledge 46 projecting from the outer periphery thereof. Side 47 is a smooth surface.

The fluid seal is assembled as follows:

Hardened steel ring 41 is fixed to ledge 46 and side 48 by any well known means, such as vulcanizing. Spring 52 is then placed in groove 43 and the ends of said spring 52 are secured, as by interlocking the end convolutions. This assembly forms one unit of the new and improved oil seal. It is slid over the body of shaft 50 which is provided with a concentric annular flange 51, so that smooth surface 47 rests against said collar 51.

Expansible washer 12 is placed on concentric ledge 14 of collar 13 with side 16 of the V, 11, resting against angular side 15. Spring 53 is placed in V groove 11 and the ends of said spring 52 are then secured, as by interlocking the end convolutions or in any other well known manner.

Housing 30 is then slid into position with key 27 engaging slot 25 of collar 13. This prevents the rotation of housing 30 in relation to collar 13. Side 32 is then fabricated into position at substantially a right angle to outside wall 31. In this manner collar 13 is permitted a limited side thrust or movement in relation to housing 30 but it cannot move sideways beyond a predetermined limited amount, thus, the housing 30 and collar 13 cannot become disengaged. Annular sealing washer 37 is then pressed into position between lower surface 21 and inner concentric surface 24. The tolerances between the parts create a hold sufficient to prevent movement radially or axially of annular sealing washer 37. Thus, the second assembly is completed. It may now be passed over shaft 50 so that face 40 presses tightly against the face of hardened steel ring 41. Outside wall 31 is driven into position in body 54 so that it is firmly held against rotation. A cover 55 may be used to help retain housing 30 in position. Cover 55 will be secured to body 54 in any well known manner such as with bolts 56. Spring 53 will force surface 16 of expansible washer 12 against angular side 15 and side 35 against angular surface 34.

It will be noted that the face 40 of annular sealing washer 37 is always self-aligning due to the two washers, viz, expansible washer 12 and annular washer 42 and thus providing double flexibility to take care of wear and liberal manufacturing tolerances.

The oil seal may be working in oil under pressure. In which case the V 11 of expansible washer 12 and the groove 43 of annular washer 42 will cause the working surfaces 16, 35, 47, 48 and 41 to exert additional sealing pressure. In other words the oil pressure will assist springs 52 and 53 in their function.

The modified form shown in Figure 2 merely represents a difference in design to make it a one package unit for facility in shipping and ease in assembling. To that end, a steel concentric ring 60 provided with a ledge 61 and a smooth inner annular surface 62 is added to the other parts described for the form shown in Figure 1. Surface 62 will tightly grip the top surface 63 of ledge 46. Outside wall 31 will be extended to embrace ledge 61 with clearance when side 32 is crimped into position. In all other respects the two forms will function the same.

Having shown and described a preferred embodiment of my invention but not wishing to limit myself to the exact showing used by way of illustration, because slight changes and modifications can be made without departing from either the spirit or the scope of the present invention.

What I claim is:

An oil seal for shaft and body members comprising a concentric annular flange on said shaft, an annular assembly mounted for rotation with said flange, said assembly including a first annular expansible washer fabricated from oil impervious material and provided with a groove in its radially outer peripheral face having an angular radial side, a steel ring vulcanized to one side of said washer, the opposite side of said washer having a smooth face, a spring in said groove exerting a force on said angular radial side to make oil tight the surface between said smooth face and said concentric annular flange, a second annular assembly fixed in said body, said second assembly including a second expansible washer and a collar having a radially inner concentric ledge, angular side and a radially outer straight edge, said second expansible washer having a V-shaped groove and resting on said concentric ledge with one leg of the V of the second expansible washer co-operating with said angular side in said collar, a housing having an angular wall co-operating with the other leg of the V and a cylindrical wall connected to the angular wall at its outer periphery, a spring fixed in said V-shaped groove urging said V legs outwardly and downwardly, said cylindrical wall of said housing being crimped radially inwardly at its free end to co-operate with said straight edge in said collar to retain the assembly in position and an annular seal washer fixed to said collar between the two assemblies and engaging said steel ring.

References Cited in the file of this patent

UNITED STATES PATENTS

| | | |
|---|---|---|
| 2,188,784 | Grothouse | Jan. 30, 1940 |
| 2,243,227 | Stratton | May 27, 1941 |
| 2,326,489 | Payne | Aug. 10, 1943 |
| 2,474,123 | Schmitz | June 21, 1949 |
| 2,505,868 | Murphy | May 2, 1950 |
| 2,599,034 | Wilkinson | June 3, 1952 |
| 2,614,874 | Helfrecht | Oct. 21, 1952 |